(12) United States Patent
Shiraishi et al.

(10) Patent No.: US 9,054,400 B2
(45) Date of Patent: Jun. 9, 2015

(54) BATTERY SYSTEM

(75) Inventors: Takeyuki Shiraishi, Kyoto (JP); Hiroaki Yoshida, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 11 days.

(21) Appl. No.: 13/980,557

(22) PCT Filed: Jan. 13, 2012

(86) PCT No.: PCT/JP2012/000176
§ 371 (c)(1),
(2), (4) Date: Jul. 18, 2013

(87) PCT Pub. No.: WO2012/098843
PCT Pub. Date: Jul. 26, 2012

(65) Prior Publication Data
US 2013/0302660 A1 Nov. 14, 2013

(30) Foreign Application Priority Data
Jan. 21, 2011 (JP) ................................. 2011-010375

(51) Int. Cl.
| H01M 10/50 | (2006.01) |
| H01M 10/617 | (2014.01) |
| H01M 2/34 | (2006.01) |
| H01M 10/44 | (2006.01) |
| H01M 10/61 | (2014.01) |
| H01M 10/42 | (2006.01) |

(52) U.S. Cl.
CPC ........ *H01M 10/5008* (2013.01); *H01M 10/425* (2013.01); *H01M 2/34* (2013.01); *H01M 10/441* (2013.01); *H01M 10/5002* (2013.01)

(58) Field of Classification Search
CPC .......... H01M 10/425; H01M 10/4207; H01M 10/482; H01M 10/441; H01M 10/5006
USPC ........................................ 429/120
See application file for complete search history.

(56) References Cited

U.S. PATENT DOCUMENTS

| 7,521,150 B2 * | 4/2009 | Seo et al. ....................... 429/177 |
| 7,898,216 B2 | 3/2011 | Seki |
| 2003/0162084 A1 | 8/2003 | Shigeta et al. |
| 2007/0216351 A1 | 9/2007 | Seki |
| 2010/0237829 A1 * | 9/2010 | Tatebayashi et al. ......... 320/118 |

FOREIGN PATENT DOCUMENTS

| JP | 2002-260745 A | 9/2002 |
| JP | 2002-291106 A | 10/2002 |

(Continued)

OTHER PUBLICATIONS

International Search Report dated Mar. 6, 2012 in PCT/JP2012/000176, with English translation thereof.
(Continued)

*Primary Examiner* — Jane Rhee
(74) *Attorney, Agent, or Firm* — McGinn IP Law Group, PLLC (57) ABSTRACT

A battery system includes a secondary battery and a bypass circuit provided with a semiconductor switch element, and the secondary battery and the bypass circuit are connected parallely. In this battery system, the semiconductor switch element is attached so as to radiate heat to a surface of a battery outer case of the secondary battery or to a bus bar.

14 Claims, 5 Drawing Sheets

(56) References Cited

FOREIGN PATENT DOCUMENTS

| JP | 2003-223938 A | 8/2003 |
| JP | 2003-229110 A | 8/2003 |
| JP | 2004-336832 A | 11/2004 |
| JP | 2006-174664 A | 6/2006 |
| JP | 2007-124775 A | 5/2007 |
| JP | 2007-299696 A | 11/2007 |
| JP | 2008-123868 A | 5/2008 |
| JP | 2009-146600 A | 7/2009 |

OTHER PUBLICATIONS

United States Office Action dated Apr. 22, 2015 in U.S. Appl. No. 13/388,601.

* cited by examiner

BATTERY SYSTEM

TECHNICAL FIELD

The present invention relates to a battery system in which a secondary battery and a bypass circuit including a semiconductor switch element are connected parallely.

BACKGROUND ART

There has been known a battery system including a secondary battery and a bypass circuit that is provided with a semiconductor switch element and is connected parallely to the secondary battery. Such a battery system causes excessive charge current to flow to the bypass circuit so as to suppress overcharge to the secondary battery, and causes the secondary battery having been charged excessively and unexpectedly to discharge to the bypass circuit so as to reduce voltage of the secondary battery. An assembled battery, which includes a plurality of connected secondary batteries as described in Patent Document 1 listed below, suppresses charging variation between the secondary batteries.

This battery system can optionally include a resistor in the bypass circuit, so as to heat the secondary battery by means of heat generated by the resistor. The semiconductor switch element in the bypass circuit does not generate so much heat. The semiconductor switch element has been conventionally provided with a small heat sink in order to radiate heat generated by the semiconductor switch element.

PRIOR ART DOCUMENT

Patent Document

Patent Document 1: JP-A-2008-123868

SUMMARY OF THE INVENTION

Problems to be Solved by the Invention

In view of improving performance of the bypass circuit, the semiconductor switch element is expected to achieve further improvement in heat radiation performance. If the heat sink attached to the semiconductor switch element is simply increased in size in order to achieve such improvement, the battery system is increased in size and cost.

The present invention has been achieved in view of these circumstances. It is an object of the present invention to improve the heat radiation performance of the semiconductor switch element included in the bypass circuit while avoiding increase in size and cost of the battery system.

Means for Solving the Problems

According to a first invention of the present application, there is provided a battery system including a secondary battery and a bypass circuit provided with a semiconductor switch element, the secondary battery and the bypass circuit being connected parallely, wherein the semiconductor switch element is arranged so as to radiate heat to a surface of a battery outer case of the secondary battery or to a bus bar.

When the semiconductor switch element is provided with a large heat sink in order to improve heat radiation performance of the semiconductor switch element, the battery system is increased in size and cost for its components. According to the first invention of the present application, the battery outer case of the secondary battery or the bus bar serves as a heat sink of the semiconductor switch element. It is thus possible to improve the heat radiation performance of the semiconductor switch element while avoiding increase in size and cost for its components. The bus bar herein is a metal member that connects terminals of separate batteries.

According to a second invention of the present application, the semiconductor switch element is in contact with the surface of the battery outer case or the bus bar with a heat diffusing member being interposed therebetween.

According to the second invention of the present application, heat generated by the semiconductor switch element can be diffused so as to be radiated to the surface of the battery outer case or to the bus bar. It is thus possible to prevent a part of the surface of the battery outer case or the bus bar from being heated locally.

According to a third invention of the present application, the semiconductor switch element is attached to a circuit board, and the circuit board is attached to the secondary battery such that the semiconductor switch element radiates heat to the surface of the battery outer case.

According to the third invention of the present application, the circuit board of the bypass circuit can be attached to the secondary battery simultaneously when the semiconductor switch element is placed so as to radiate heat, thereby facilitating the work.

According to a fourth invention of the present application, the battery outer case has a surface provided with a terminal, and the semiconductor switch element is arranged so as to radiate heat to the surface provided with the electrode terminal.

According to the fourth invention of the present application, there is a gap between the surface provided with the terminal of the battery outer case and a power generating element accommodated in the battery outer case. This gap prevents conduction of heat radiated from the semiconductor switch element to the power generating element.

Advantages of the Invention

According to the present invention, the battery outer case of the secondary battery or the bus bar serves as a heat sink of the semiconductor switch element. It is thus possible to improve heat radiation performance of the semiconductor switch element while avoiding increase in size of the battery system and increase in cost for its components.

BRIEF DESCRIPTION OF THE DRAWINGS

FIGS. 6(*a*) and 6(*b*) are diagrams of circuit configurations according to the embodiment of the present invention.

MODES FOR CARRYING OUT THE INVENTION

A battery system according to an embodiment of the present invention is described below with reference to the drawings. The battery system according to the present embodiment is exemplified by a nonaqueous electrolyte secondary battery as a secondary battery.

First Embodiment

Figure 1:
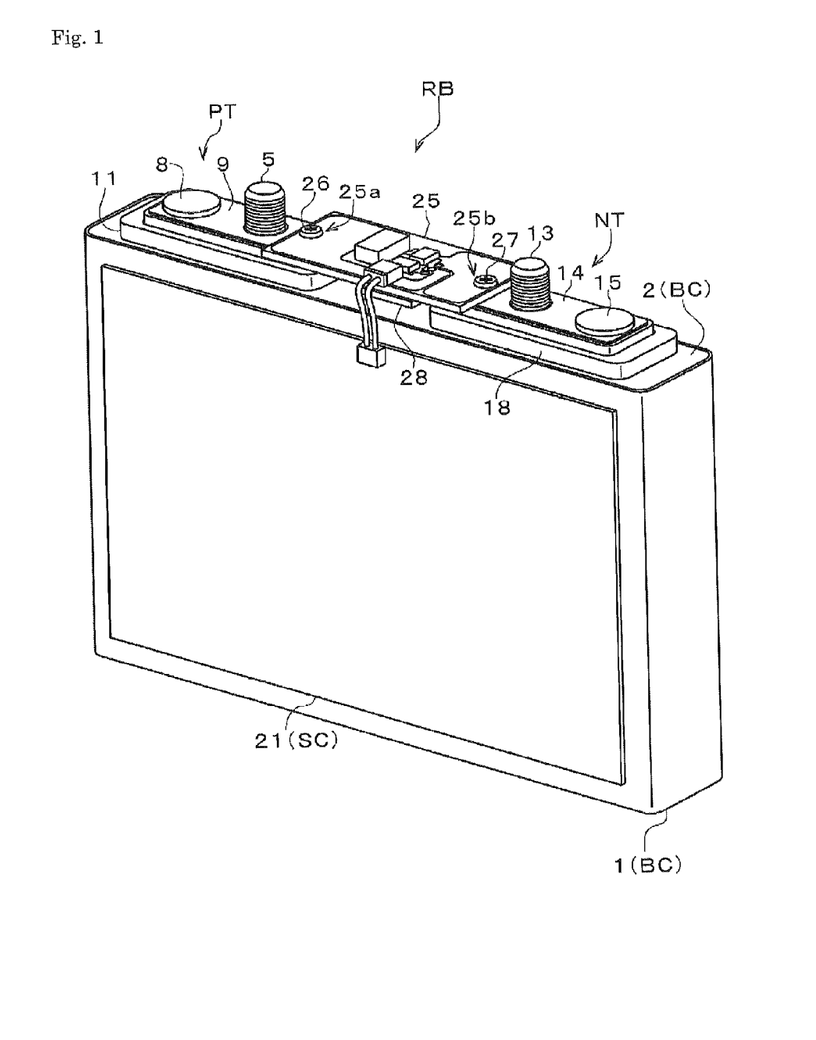
FIG. 1 is a perspective view showing the outer appearance of a battery according to an embodiment of the present invention.
Figure 5:
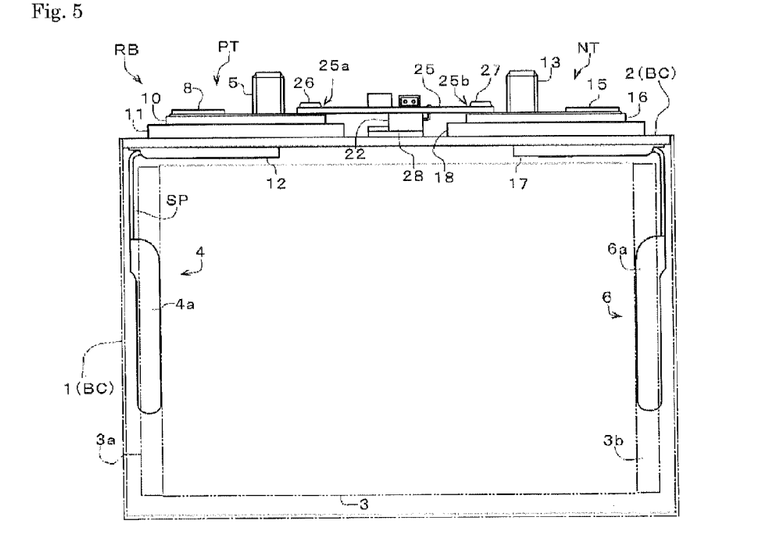
FIG. 5 is a front view showing the interior of the battery according to the embodiment of the present invention.

As shown in FIGS. 1 and 5, a secondary battery RB according to the present embodiment includes a battery outer case BC having a case body 1 and a lid 2. The lid 2 is a rectangular plate member and has a positive electrode terminal PT and a negative electrode terminal NT. The case body 1 in a rectangular parallelepiped shape has an opening that is covered with the lid 2. The case body 1 and the lid 2 are welded together to form the battery outer case BC.

Figure 2:
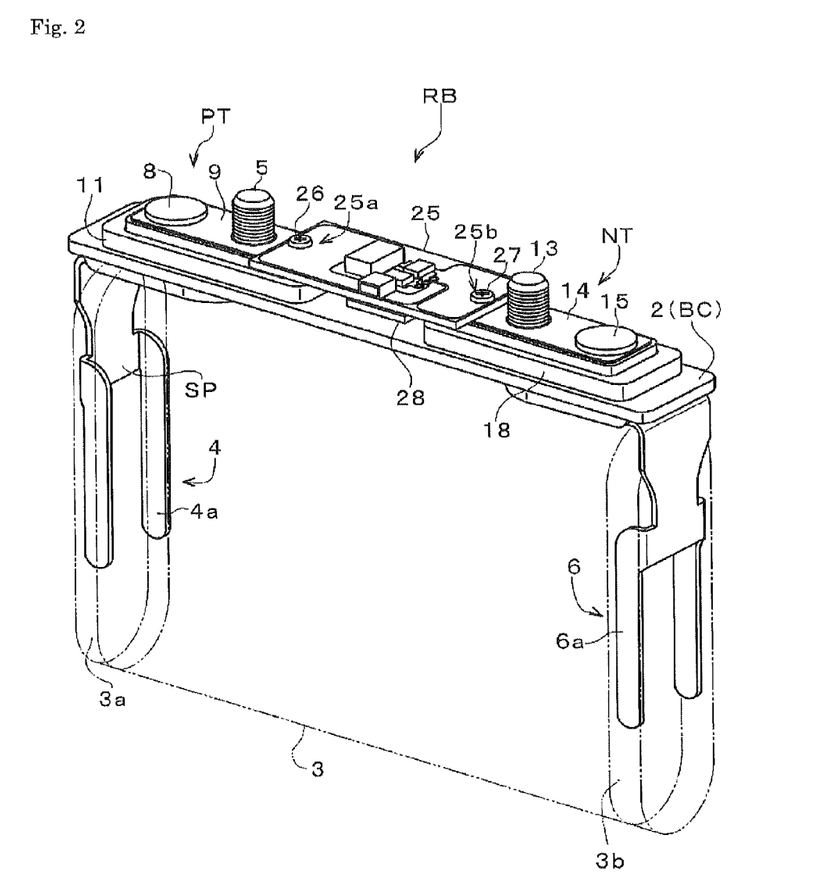
FIG. 2 is a perspective view showing the interior of the battery according to the embodiment of the present invention.

The case body 1 has a flat rectangular parallelepiped shape, and the battery outer case BC has a substantially rectangular parallelepiped shape. FIG. 2 illustrates the interior configuration of the completed secondary battery RB. FIG. 5 illustrates the case body 1 with dashed lines, and a power generating element 3 to be described later with two-dot chain lines.

The battery outer case BC accommodates the power generating element 3 and current collectors 4 and 6, which are indicated by two-dot chain lines in FIGS. 2 and 5. The current collectors 4 and 6 are members electrically connecting the power generating element 3 and the positive and negative electrode terminals. Both the current collector 4 and the current collector 6 are conductors. The positive current collector 4 is made of aluminum, whereas the negative current collector 6 is made of copper.

The power generating element 3 is formed by winding a positive electrode plate to which a positive active material is applied and a negative electrode plate to which a negative active material is applied, with a separator being interposed therebetween. The power generating element 3 has an unapplied portion 3a extending laterally and an unapplied portion 3b extending laterally and oppositely. No positive active material is applied to the unapplied portion 3a, whereas no negative active material is applied to the unapplied portion 3b.

The power generating element 3 is accommodated such that a winding axis of the power generating element 3 is parallel to the longitudinal direction of the lid 2. As shown in FIG. 5, the unapplied portion 3a of the positive electrode plate and a connective portion 4a of the current collector 4 are overlapped and welded together, and the unapplied portion 3b of the negative electrode plate and a connective portion 6a of the current collector 6 are overlapped and welded together.

The positive electrode terminal PT attached to the lid 2 is electrically connected to the positive current collector 4, and the negative electrode terminal NT is electrically connected to the negative current collector 6. The connection structure between the positive electrode terminal PT and the positive current collector 4 and the connection structure between the negative electrode terminal NT and the current collector 6 have substantially the same shapes and are located symmetrically with each other.

Figure 3:
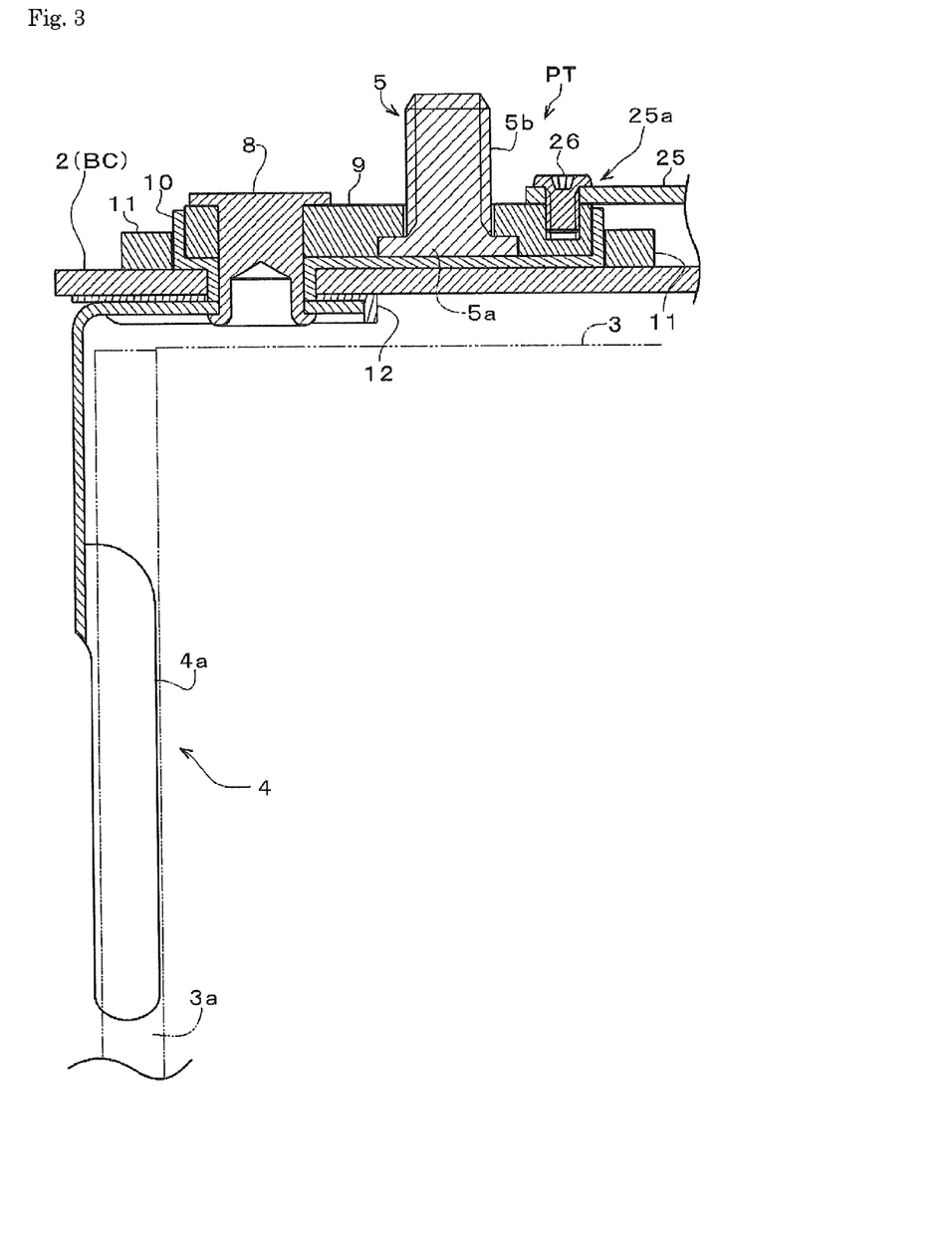
FIG. 3 is a partial sectional view of the embodiment of the present invention.

As shown in FIGS. 1 and 3, the positive electrode terminal PT includes a terminal bolt 5, a hollow rivet 8, and a metal plate 9. As shown in FIG. 3, the terminal bolt 5 and the current collector 4 are electrically connected with each other by way of the hollow rivet 8 and the metal plate 9. The terminal bolt 5, the hollow rivet 8, and the metal plate 9 are each made of metal.

The metal plate 9 has a through hole allowing a screw portion 5b of the terminal bolt 5 to pass therethrough and a through hole allowing a shaft portion of the hollow rivet 8 to pass therethrough. The metal plate 9 is retained by upper packing 10 serving as an insulating seal member, and the upper packing 10 is retained by a frame 11 that is attached to the upper surface of the lid 2. The upper packing 10 extends in a space around the through hole for the hollow rivet 8 to pass therethrough and the hollow rivet 8 penetrating the lid 2.

There is provided lower packing 12, which serves as an insulating seal member, between the lid 2 and the current collector 4 in the battery outer case BC. The hollow rivet 8 is caulked so as to nip the metal plate 9, the upper packing 10, the lower packing 12, and the current collector 4. The upper packing 10 and the lower packing 12 achieve insulation and airtightness between the hollow rivet 8 and the lid 2.

The negative electrode terminal NT is configured similarly to the positive electrode terminal PT, and includes conductive members such as a terminal bolt 13, a metal plate 14, and a hollow rivet 15 as well as insulating seal members such as upper packing 16 and lower packing 17. The hollow rivet 15 is caulked so as to nip the metal plate 14, the upper packing 16, the lower packing 17, and the current collector 6. Similarly to the positive electrode portion, the upper packing 16 has a periphery surrounded with a frame 18.

Figure 6A:
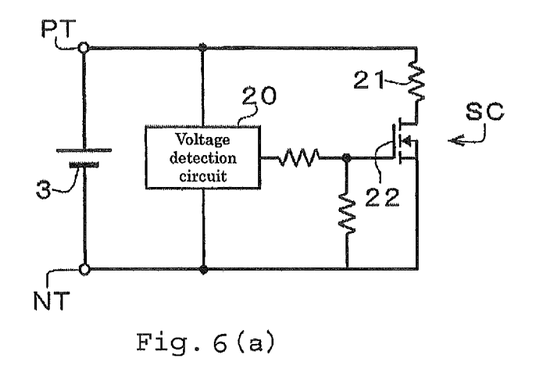

As shown in FIG. 6(a), the battery system according to the present embodiment includes a voltage detection circuit 20 for detecting voltage of the secondary battery RB and a bypass circuit SC connected parallely to the secondary battery RB. The bypass circuit SC has a resistor 21 and a semiconductor switch element 22 that are connected in series. In the present embodiment, there are provided a heater in a sheet shape as the resistor 21 and a MOSFET as the semiconductor switch element 22.

If the voltage of the secondary battery RB does not reach predetermined voltage, the voltage detection circuit 20 transmits an L level signal to the semiconductor switch element 22 so as to keep the semiconductor switch element 22 in the OFF state. In contrast, if the voltage of the secondary battery RB exceeds the predetermined voltage, the voltage detection circuit 20 transmits an H level signal to the semiconductor switch element 22 so as to turn ON the semiconductor switch element 22. When the semiconductor switch element 22 is switched ON, charge current flows to the bypass circuit SC.

Overcharge to the secondary battery RB can be prevented by appropriately setting the predetermined voltage.

Provision of the bypass circuit SC causes the secondary battery RB to be heated so as to improve charge-discharge performance, in addition to preventing the overcharge to the secondary battery RB. If the secondary battery RB has temperature lower than predetermined temperature, charge current is set to partially flow to the resistor 21 by switching ON the semiconductor switch element 22. The resistor 21 is embodied as the heater arranged on a surface of the secondary battery RB, and current flows to the heater so that the secondary battery RB can be heated. Typically, the secondary battery at low temperature deteriorates in charge-discharge performance. The secondary battery RB is heated by the resistor 21 in the bypass circuit SC, thereby to improve the charge-discharge performance at low temperature.

Figure 6B:
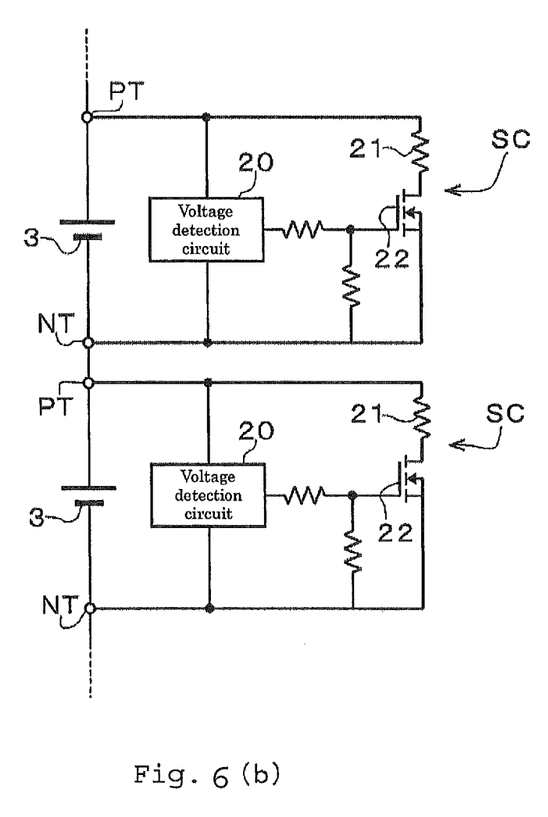

FIG. 6(b) shows an assembled battery including a plurality of battery systems that are connected in series and each includes a secondary battery RB and a bypass circuit SC. In this assembled battery, it is possible to determine whether to flow charge current to the corresponding bypass circuit SC of each of the secondary batteries RB, thereby reducing variation in charge voltage.

Figure 4:
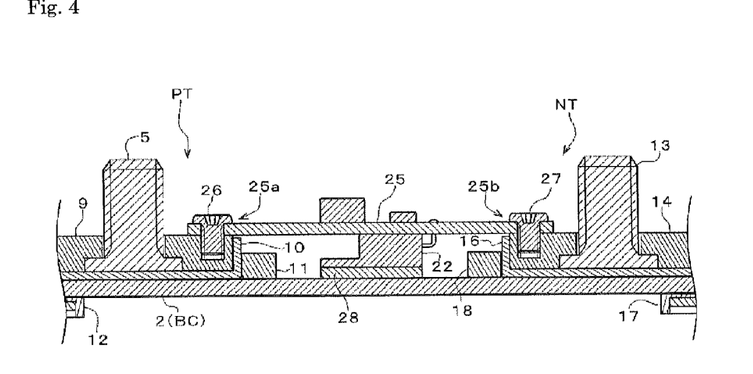
FIG. 4 is a partial sectional view of the embodiment of the present invention.

As shown in FIGS. 1 and 4, the voltage detection circuit 20 and the semiconductor switch element 22 in the bypass circuit SC are arranged on a circuit board 25. The sheet-like resistor 21 in the bypass circuit SC is bonded to a surface of the case body 1 of the secondary battery RB.

The circuit board 25 is attached and fixed such that it bridges the positive electrode terminal PT and the negative electrode terminal NT. More specifically, the circuit board 25 has both ends fixed to the metal plate 9 at the positive electrode portion and the metal plate 14 at the negative electrode portion by means of screws, respectively. The circuit board 25 has a positive electrode connecting terminal 25a and a negative electrode connecting terminal 25b that are electrically connected to the positive electrode terminal PT and the negative electrode terminal NT by means of fixing screws 26 and 27, respectively.

The resistor 21 in the bypass circuit SC is connected with the circuit board 25 by way of a connector. The semiconductor switch element 22 in the bypass circuit SC is arranged in a space between the circuit board 25 and the lid 2.

The semiconductor switch element 22 has a predetermined specification and has terminals each connected to wiring on the circuit board 25. The semiconductor switch element has a radiating surface pressed against the lid 2 with a heat diffusing member 28 of excellent heat conductivity being interposed therebetween. The semiconductor switch element is attached such that heat of the radiating surface is radiated to a surface of the battery outer case BC. The heat diffusing member 28 is provided between the radiating surface of the semiconductor switch element 22 and the surface of the battery outer case BC so as to diffuse heat of the radiating surface of the semiconductor switch element 22 and radiate to the surface of the battery outer case BC. This prevents a part of the battery outer case BC from locally having heat. Preferred examples of the heat diffusing member 28 include an insulating resin sheet.

Described below is how to arrange the semiconductor switch element 22 in order to radiate heat of the semiconductor switch element 22 to the battery outer case BC. The heat diffusing member 28 is bonded to the radiating surface of the semiconductor switch element 22, and the semiconductor switch element 22 is attached to the circuit board 25. The circuit board 25 is arranged such that the radiating surface of the semiconductor switch element 22 faces the lid 2 and is fixed to the metal plates 9 and 14 by means of the fixing screws 26 and 27, respectively. The attached level of the circuit board 25 and the thickness of the heat diffusing member 28 are set such that the semiconductor switch element 22 fixed by means of the fixing screws 26 and 27 is pressed against the lid 2. Such attachment can be easily performed because the radiating surface of the semiconductor switch element 22 can be arranged so as to be in contact with the lid 2 with the heat diffusing member 28 being interposed therebetween, simultaneously when the circuit board 25 is attached to the secondary battery RB.

As described above, the radiating surface of the semiconductor switch element 22 is pressed against the lid 2 with the heat diffusing member 28 being interposed therebetween, so that heat generated by the semiconductor switch element 22 can be efficiently radiated to the battery outer case BC.

As shown in FIGS. 2 and 5, the semiconductor switch element 22 is arranged so as to be in contact with the lid 2 that is provided with the positive electrode terminal PT and the negative electrode terminal NT. The lower packing 12 and the lower packing 17 are provided inside the lid 2. There is a gap between the lid 2 and the power generating element 3 in order to provide spaces for the lower packing 12 and the lower packing 17. In the configuration in which the lid 2 provided with the positive electrode terminal PT and the negative electrode terminal NT has the surface in contact with the semiconductor switch element 22, the gap between the lid 2 and the power generating element 3 prevents direct conduction of heat radiated from the semiconductor switch element 22 to the power generating element 3 and excessively heating the power generating element 3. In other words, in view of preventing heat conduction to the power generating element 3, heat of the semiconductor switch element 22 is preferably radiated to the surface provided with the terminals of the battery outer case BC inclusive of the case body 1 and the lid 2.

In the present embodiment, the battery outer case BC is provided with the positive electrode terminal PT and the negative electrode terminal NT, and the circuit board 25 is arranged so as to, bridge the positive electrode terminal PT and the negative electrode terminal NT. More specifically, the semiconductor switch element 22 is attached to the circuit board 25, and the circuit board 25 is arranged between the positive electrode terminal PT and the negative electrode terminal NT such that the semiconductor switch element 22 faces the battery outer case BC. The battery system can be further reduced in size when the circuit board 25 inclusive of the semiconductor switch element 22 is arranged as in the present embodiment.

Second Embodiment

According to the first embodiment, heat of the semiconductor switch element 22 is radiated to the surface of the battery outer case BC. The heat can be alternatively radiated to a bus bar connecting terminals of separate secondary batteries.

In the present embodiment, the bus bar is attached to the terminal bolt 5 or 13, and the radiating surface of the semiconductor switch element 22 is arranged so as to be in contact with the bus bar. The bus bar and the semiconductor switch element 22 can be in direct contact with each other, or can be in indirect contact with each other with the heat diffusing member being interposed therebetween.

The configuration of radiating heat to the battery outer case BC as in the first embodiment is compared with the configuration of radiating heat to the bus bar as in the second embodiment. The configuration of discharging to the battery outer case BC achieves higher heat radiation efficiency because the battery outer case BC has a surface area much larger than that of the bus bar. However, the configuration of radiating heat to the bus bar as in the second embodiment can still achieve the advantages of the present invention.

Other Embodiments

According to the first embodiment, the MOSFET is provided as the semiconductor switch element 22. It is alternatively possible to use any one of various semiconductor switch elements such as a bipolar transistor.

According to the first embodiment, the bypass circuit SC includes the resistor 21. The advantages of the present invention can be achieved also in a configuration including no resistor 21 (heater).

DESCRIPTION OF REFERENCE SIGNS

BC Battery outer case
PT Positive electrode terminal
NT Negative electrode terminal
SC Bypass circuit
21 Resistor
22 Semiconductor switch element
25 Circuit board
25a Positive electrode connecting terminal 25b Negative electrode connecting terminal
26,27 Fixing screw
28 Heat diffusing member

The invention claimed is:

1. A battery system, comprising:
   a secondary battery including a battery outer case;
   a bypass circuit including a circuit board and a semiconductor switch element attached to the circuit board, the secondary battery and the bypass circuit being connected parallely; and
   a heat diffusing member disposed such that the semiconductor switch element is in contact with a surface of the battery outer case or with a bus bar through the heat diffusing member so as to radiate heat to the surface of the battery outer case or to the bus bar.

2. The battery system according to claim 1, wherein the battery outer case includes a surface provided with an electrode terminal, and the semiconductor switch element is arranged so as to radiate heat to the surface of the battery outer case provided with the electrode terminal.

3. The battery system according to claim 1, wherein a space is defined between the circuit board and the surface of the battery outer case or between the circuit board and the bus bar, and the heat diffusing member is arranged in the space.

4. The battery system according to claim 3, wherein the semiconductor switch element comprises a radiating surface that is arranged in the space.

5. The battery system according to claim 4, wherein the radiating surface has a largest cross-sectional area in the semiconductor switch element.

6. The battery system according to claim 4, wherein the heat diffusing member is bonded to the radiating surface.

7. The battery system according to claim 1, wherein the heat diffusing member comprises an insulating resin sheet.

8. The battery system according to claim 3, wherein the semiconductor switch element comprises a first surface attached to the circuit board and a second surface opposite the first surface, the second surface being in contact with the heat diffusing member.

9. The battery system according to claim 3, wherein the surface of the battery outer case is provided with a positive electrode terminal surface and a negative electrode terminal surface, and
   wherein the circuit board is placed on the positive electrode terminal surface and the negative electrode terminal surface.

10. The battery system according to claim 9, wherein the circuit board comprises a first portion, a second portion opposite the first portion, and a third portion connecting the first portion to the second portion,
    wherein the first portion is placed on the positive electrode terminal surface,
    wherein the second portion is placed on the negative electrode terminal surface, and
    wherein the semiconductor switch element is attached to the third portion.

11. The battery system according to claim 1, wherein the secondary battery comprises a power generating element accommodated in the battery outer case, and
    wherein a gap is defined between the surface of the battery outer case and the power generating element.

12. A battery system, comprising:
    a secondary battery including a battery outer case;
    a bypass circuit including a circuit board and a semiconductor switch element attached to the circuit board, the secondary battery and the bypass circuit being connected parallely; and
    a heat diffusing member disposed such that the semiconductor switch element is in a contact with a surface of the battery outer case or with a bus bar through the heat diffusing member,
    wherein a space is defined between the circuit board and a surface of the battery outer case or between the circuit board and a bus bar,
    wherein the heat diffusing member is arranged in the space, and
    wherein the semiconductor switch element comprises a first surface attached to the circuit board and a second surface opposite the first surface, the second surface being in a contact with the heat diffusing member.

13. The battery system according to claim 12, wherein the surface of the battery outer case is provided with a positive electrode terminal surface and a negative electrode terminal surface, and
    wherein the circuit board is placed on the positive electrode terminal surface and the negative electrode terminal surface.

14. The battery system according to claim 13, wherein the circuit board comprises a first portion, a second portion opposite the first portion, and a third portion connecting the first portion to the second portion,
    wherein the first portion is placed on the positive electrode terminal surface,
    wherein the second portion is placed on the negative electrode terminal surface, and
    wherein the semiconductor switch element is attached to the third portion.

* * * * *